United States Patent [19]

Cappels, Sr. et al.

[11] Patent Number: 5,670,985
[45] Date of Patent: Sep. 23, 1997

[54] SYSTEM AND METHOD FOR ADJUSTING THE OUTPUT OF AN OUTPUT DEVICE TO COMPENSATE FOR AMBIENT ILLUMINATION

[75] Inventors: Richard D. Cappels, Sr., San Jose; Mathew Hernandez, Half Moon Bay, both of Calif.

[73] Assignee: Apple Computer, Inc., Cupertino, Calif.

[21] Appl. No.: 240,002

[22] Filed: May 9, 1994

[51] Int. Cl.$^6$ .................................................. G09G 5/04
[52] U.S. Cl. .................. 345/153; 345/22; 345/207; 348/184; 348/189
[58] Field of Search ............................. 345/22, 153, 207; 348/184, 185, 189

[56] References Cited

U.S. PATENT DOCUMENTS

| | | | |
|---|---|---|---|
| 4,106,846 | 8/1978 | Russin . | |
| 4,386,345 | 5/1983 | Narveson et al. | 345/207 |
| 4,700,218 | 10/1987 | Thomsen et al. | 358/29 |
| 4,703,345 | 10/1987 | Matsuzaki et al. | 358/74 |
| 4,733,227 | 3/1988 | Kanema et al. | 348/189 |
| 4,742,387 | 5/1988 | Oshima | 358/29 |
| 4,746,970 | 5/1988 | Hosokawa et al. | 358/29 |
| 4,814,864 | 3/1989 | Pritchard | 358/29 |
| 4,962,418 | 10/1990 | Kamaga | 358/29 |
| 5,181,103 | 1/1993 | Tatsuya | 358/64 |
| 5,216,492 | 6/1993 | Dorrough et al. | 348/185 |

(List continued on next page.)

FOREIGN PATENT DOCUMENTS

| | | | |
|---|---|---|---|
| 0351188 | 1/1990 | European Pat. Off. . | |
| 384879 | 8/1990 | European Pat. Off. | G06F 3/033 |
| 0539943 | 5/1993 | European Pat. Off. . | |
| 0562971 | 9/1993 | European Pat. Off. . | |
| 2169773 | 1/1986 | United Kingdom | H04N 9/73 |
| 0313795 | 9/1988 | WIPO | H04N 17/02 |

OTHER PUBLICATIONS

Sonnetech, Ltd., ColorMatch Slide Presentation, 1993, Slides 1–12.
Sonnetech, Ltd., ColorMatch Promotional Materials, 1993, pp. 1–4.
IBM Technical Disclosure Bulletin, vol. 35, No. 3, Aug. 1992, Light–Controlled Software Products, pp. 267–269.
IBM Technical Disclosure Bulletin, vol. 37, No. 1, Jan. 1994, Dynamic Time–Dependent User Interface Modification, pp. 287–289.
IBM Technical Disclosure Bulletin, vol. 35, No. 3, Aug. 1992, Light–Controlled Software Products, pp. 267–269.
IBM Technical Disclosure Bulletin, vol. 37, No. 1, Jan. 1994, Dynamic Time–Dependent User Interface Modification, pp. 287–289.

*Primary Examiner*—Richard Hjerpe
*Assistant Examiner*—Juliana S. Kim
*Attorney, Agent, or Firm*—Fenwick & West LLP

[57] ABSTRACT

A system for compensating the output of an output device to eliminate reflected ambient illumination comprises a display device, a calibration memory, a reflectivity memory, a memory, a processor, an input device, a video card, and an achromatic card that serves as a standard for comparison to the output of the output device. The reflectivity memory stores the reflectivity characteristics of the output device. The calibration memory stores the optical characteristics of the output device. The memory stores the reflectivity characteristics of the achromatic card, data, and program instruction steps of the system. The output of the output device is adjusted to match the ambient illumination reflected from the achromatic card. The processor then determines the tristimulus values of the ambient illumination through the known tristimulus values of the output generated by the output device, the reflectivity characteristics of the achromatic card, and the reflectivity characteristics of the output device. The processor then uses the tristimulus values of the ambient illumination to determine the bias setting of the output device to compensate all outputs generated by the output device for the ambient illumination reflected from the output device.

32 Claims, 12 Drawing Sheets

U.S. PATENT DOCUMENTS

| | | | |
|---|---|---|---|
| 5,216,504 | 6/1993 | Webb et al. | 358/139 |
| 5,247,358 | 9/1993 | Richards | 348/189 |
| 5,257,096 | 10/1993 | Oshima | 348/189 |
| 5,258,828 | 11/1993 | Sano et al. | 358/29 |
| 5,313,291 | 5/1994 | Appel et al. | 358/501 |
| 5,325,195 | 6/1994 | Ellis et al. | 348/189 |
| 5,371,537 | 12/1994 | Bohan et al. | 348/189 |
| 5,440,339 | 8/1995 | Harrison et al. | 348/189 |
| 5,483,259 | 1/1996 | Sachs | 345/153 |
| 5,512,961 | 4/1996 | Cappels, Sr. | |

5,670,985

SYSTEM AND METHOD FOR ADJUSTING THE OUTPUT OF AN OUTPUT DEVICE TO COMPENSATE FOR AMBIENT ILLUMINATION

CROSS-REFERENCE TO RELATED APPLICATION

The present invention relates to pending U.S. patent application Ser. No.: 08/036,349 filed Mar. 24, 1993, invented by Richard D. Cappels, Sr., entitled "Method And System Of Achieving Accurate White Point Setting Of A CRT Display," which is hereby incorporated herein by reference.

BACKGROUND OF THE INVENTION

1. Field of the Invention

This invention relates to computer displays and more particularly to a system and method for adjusting the output of a computer display to compensate for ambient illumination.

2. Description of the Background Art

As computers have become cheaper and more versatile, people have applied them to an expanding array of applications and tasks. People now use computers in many areas where, until recently, the expense of computers was so great as to prohibit their use. Many of these new applications require the precise display of data on the output device associated with the computer.

This need for precision of the data displayed on the output device includes the accuracy of the color and intensity of the display. Graphic artists now frequently use computers to create designs. Graphic artists require that output devices precisely display color so that they may observe, the final appearance of their creation. Electrical engineers also use computers to layout devices in their designs of integrated circuits. In a layout, each circuit is assigned a shape and color and is shown on the output device of the computer. The overlap and interaction of circuits is shown by displaying the circuits in different shades and colors. Subtle shades and differences in color may be relevant to the ultimate validity of a design. Thus, it is imperative that the color and intensity of the output of an output device be accurate.

The ambient illumination in which an output device operates affects the observed output of the output device. The ambient illumination reflects off the glass and inside coatings of the front glass plate of the output device and alters the color and intensity of the output that the user observes, While color and intensity must be accurately displayed, any means for achieving such accuracy must be inexpensive. The decrease in the cost of computers is partially responsible for their increased use. An expensive system that accurately compensates the output of a display device would be unavailable to many new users of computers because of cost. Such a compensation system would increase the cost of using computers such that the use of computers would once again be impractical.

Several low cost approaches have been taken to compensate accurately the color and intensity of the output of a display device. One approach is to pre-set the display device to compensate for a pre-determined amount of certain types of ambient illumination. The output device may be set only once either at the factory or at a retail outlet to compensate for the type of ambient illumination in which the user will operate the output device. The output device may be adjusted to a fixed setting if the user will operate it in fluorescent light, adjusted to a different fixed setting if the user will operate the output device in incandescent light, or adjusted to some other fixed setting for another type of light source. This approach is very inaccurate and is of little utility. There is a broad spectrum of light that is emitted from different light sources. Thus, having only one setting for all fluorescent light is inadequate. This approach also does not account for the mixture of light from different types of light sources. Finally, this approach allows for only one setting and cannot accommodate changes in the ambient illumination.

Another approach is to supply the user with an achromatic card or a series of colored cards that serve as standards. This prior art system generates colored regions on the output device. The user holds the cards near the output device and manually adjusts a control to modify the color and intensity of the output of the output device. In this way, the settings of the output device are modified to account for the ambient illumination. A major problem with this approach is that it is extremely difficult to adjust analog controls to control the color and intensity with the necessary accuracy. Furthermore, such an approach only allows for one setting that is not recorded. If a certain ambient illumination exists for a certain period of time, it is not possible to record a setting so that the user may return to a prior setting when the ambient illumination returns to a previous state. Finally, since the setting is not recorded, is not possible to return to a setting if it should be inadvertently modified or should drift.

Therefore, a system and method is needed to compensate accurately the output of a display device to account for ambient illumination. Such a system needs to calculate the proper setting and to save the setting quickly and automatically The system also should not add significantly to the cost of the display device.

SUMMARY OF THE INVENTION

The present invention overcomes the problems and shortcomings of the prior art with a system and method for adjusting the output of a display device to compensate for ambient illumination. The present invention preferably comprises a display device, a display circuitry, a display controller, a pre-recorded calibration memory, a pre-recorded reflectivity memory, a video card, an input device, a processor, a memory, and an achromatic card. The pre-recorded reflectivity memory stores the reflectivity characteristics of the glass and inside coatings of the front glass plate of the output device. The prerecorded calibration memory stores characteristics of the display device. The memory stores the reflectivity characteristics of the achromatic card, a pointer, program instruction steps, compensated beam current values, and data.

The processor, through the video card, the display controller, and the display circuitry, adjusts the output of the output device to match the ambient illumination reflected from the achromatic card. From the known tristimulus values of the output generated by the output device and the known reflectivity characteristics of the glass and inside coatings of the front glass plate and the achromatic card, the processor calculates the hue and intensity of the ambient illumination. The processor then calculates the electron beams necessary to generate a compensated white point and compensates the output device for the ambient illumination reflected by the front glass plate. The processor stores the compensated beam current values, with a record of the time at which they were determined, in the memory. The processor then re-calibrates the output device using the compensated beam current values.

DETAILED DESCRIPTION OF THE PREFERRED EMBODIMENT

Figure 1:
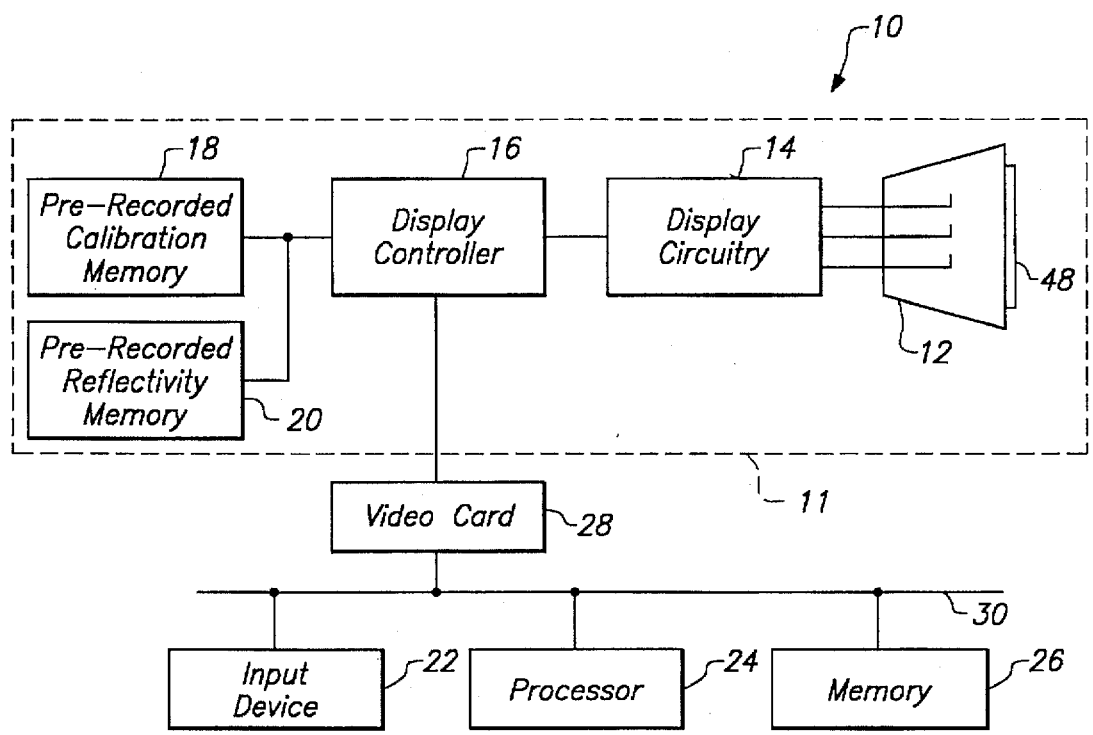
FIG. 1 is a block diagram showing the system of the present invention for adjusting the output of a display device to compensate for ambient illumination.

Referring now to FIG. 1, a block diagram of the preferred embodiment of a system 10 for adjusting the color and intensity of the output of an output device to compensate for ambient illumination is shown. The system 10 comprises an output device 11, an input device 22, a processor 24, a memory 26, and a video card 28. The output device 11, input device 22, processor 24, memory 26, and video card 28 are coupled together by a bus 30 in a von Neuman architecture. Those skilled in the art will realize that the output device 11, the input device 22, the processor 24, the memory 26, and the video card 28 may be coupled together in other architectures, even simultaneously with the present invention, without departing from the spirit and scope of the present invention. The system 10 measures the hue and intensity of the ambient illumination and adjusts the output of the output device 11 so that the color and intensity of the output is as realistic as possible.

The system 10 is preferably a Macintosh Computer model Quadra 800 from Apple Computer, Inc. of Cupertino, Calif. The system 10 uses a conventional operating system such as the System 7.1 Operating System from Apple Computer, Inc. Those skilled in the art will realize that other computer systems and other operating systems may be used to implement the present invention.

The output device 11 comprises, a display device 12, a display circuitry 14, a display controller 16, a pre-recorded calibration memory 18, a prerecorded reflectivity memory 20. The display device 12 is a conventional display device such as a cathode ray tube ("CRT"). The present invention is discussed with reference to cathode ray tube display devices. The present invention is, however, fully applicable to all display device technologies including liquid crystal displays and gas discharge displays. Furthermore, the present invention may be used to compensate for ambient illumination the output of color printers, color photograph developers, and other such devices. The display device 12 includes a front glass plate 48 through which the display device 12 outputs visual data. The front glass plate 48 is typically coated on its inner surface with chemicals which may include phosphors. The output comprises a plurality of pixels of light. Each pixel is made up of a red light, a blue light, and a green light. Within a pixel, each color may vary individually in intensity. The system 10 utilizes a model of human perception of color that will be explained in more detail below with reference to FIG. 6.

The display circuitry 14 is an electronic circuit that drives the output of display device 12. In a CRT, the display circuitry is a set of cathodes and other circuit elements that generate three electron beams. The output signal of the display circuitry 14 comprises three channels, one for each color output by the output device 11. In accordance with standard convention, the channel for the red color is referred to as the R channel; the channel for the green color is referred to as the G channel; and the channel for the blue color is referred to as the B channel. Each electron beam stimulates one of the channels of the colors on the output. The display circuitry 14 has inputs and outputs. The outputs of the display circuitry 14 are coupled to respective channel inputs of the display device 12.

The display controller 16 is a conventional display controller such as a basic microprocessor. The display controller 16 directs communications between the display circuitry 14 and the other devices. The display controller 16 has inputs and an output. The output of the display controller 16 is coupled to the display circuitry 14.

The input device 22 is a conventional keyboard and mouse type controller for inputting data into computer systems. The input device 22 is coupled to the bus 30.

The processor 24 is a conventional microprocessor such as the 680xx Series microprocessor manufactured and sold by Motorola, Inc. of Schaumburg, Ill. The processor 24 executes arithmetic functions, makes data comparisons, and executes program instruction steps stored in the memory 26. The processor 24 includes a clock for generating the current time for the system 10. The processor 24 is coupled to the bus 30.

The video card 28 is a conventional video card used for processing data signals from the processor 24. The video card 28 accepts an input of a digital data signal from the processor 24. The video card 28 formats the data for the size of the display device 12. The video card 28 then converts the input data signal from a digital signal to an analog signal and divides the data signal into the three channels, the R, G, and B channels. The video card 28 has inputs and outputs and is coupled to the bus 30 and to the display controller 16. The video card 28 outputs a video signal for the three channels to the display controller 16.

The pre-recorded reflectivity memory ("PRM") 20 is any non-volatile memory such as a read only memory ("ROM"), an erasable programmable read-only memory (EPROM), or a programmable read only memory (PROM). The PRM 20 stores the reflectivity constant, $K_2$, for the glass and inside coatings of the front glass plate 48 of the display device 12. The reflectivity constant, $K_2$, is the percentage of the light, which impinges on the glass and inside coatings of the front glass plate 48 of the display device 12, that is reflected. The reflectivity constant, $K_2$, accounts for front and back surface reflectance and transmission of incident ambient illumination from the glass and inside coatings of the front glass plate 48. The reflectivity constant, $K_2$, is measured at the factory where the display device 12 is manufactured. $K_2$ is preferably a single value that describes, regardless of wavelength, the reflectivity of all visible light that is incident upon the front glass plate 48. In an alternate embodiment, $K_2$ may be three values $K_{2x}$, $K_{2y}$, and $K_{2z}$. Where $K_{2x}$ describes the reflectivity of the x channel, $K_{2y}$ describes the reflectivity of the y channel, and $K_{2z}$ describes the reflectivity of the z channel from the glass and inside coatings of the front glass plate 48. Those skilled in the art will recognize the x channel, the y channel, and the z channel. Typically, $K_2$ equals 0.059 for high contrast CRTs. The PRM 20 is coupled to the processor 24 through the display controller 16.

The bus 30 is a conventional bus for transmitting data, address, and command signals. While the bus 30 is described as a single bus, those skilled in the art will realize that the bus 30 comprises a data bus, an address bus, and a command bus.

Figure 2:
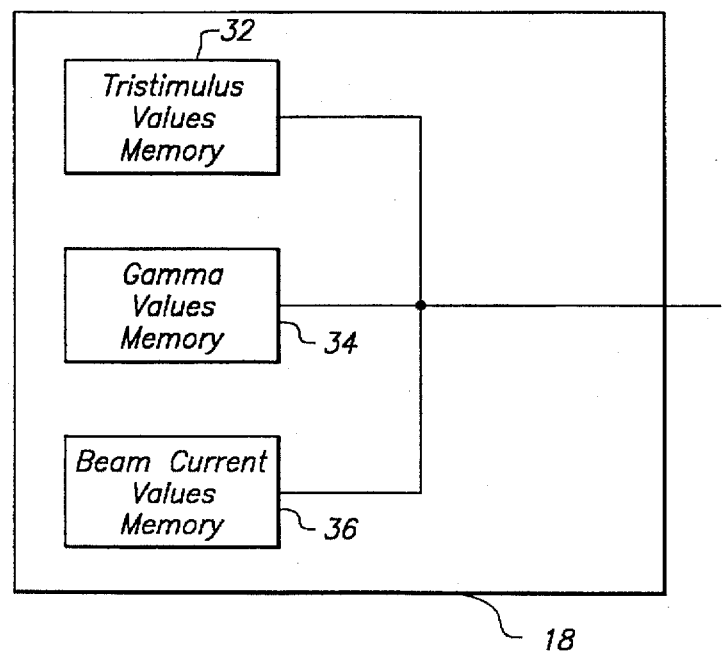
FIG. 2 is a block diagram showing the preferred embodiment of the pre-recorded calibration memory of the present invention.

Referring now to FIG. 2, a block diagram of the pre-recorded calibration memory ("PCM") 18 is shown. The PCM 18 is any non-volatile memory such as a ROM, an EPROM, or a PROM. The PCM 18 shown in FIG. 2 contains data for a CRT. If another display technology is used, other calibration data, analogous to, but not identical to, the calibration data for a CRT type display device, would be stored in the PCM 18. The data stored in the PCM 18 is measured and recorded therein at the factory where the output device 11 is manufactured. A calibration memory as described in the pending U.S. patent application Ser. No.: 08/036,349, entitled "Method And System Of Achieving Accurate White Point Setting Of A CRT Display," which is incorporated herein by reference, may be used for the PCM 18. The PCM 18 comprises a tristimulus values memory 32, a gamma values memory 34, and a beam current values memory 36.

The tristimulus values memory 32 stores nine tristimulus values for the output device 11. The output of the output device 11 is given by the equations:

$$X_C = (I_R x_R) + (I_G x_G) + (I_B x_B) \quad (1)$$

$$Y_C = (I_R y_R) + (I_G y_G) + (I_B y_B) \quad (2)$$

$$Z_C = (I_R z_R) + (I_G z_G) + (I_B z_B) \quad (3)$$

Where $X_C, Y_C,$ and $Z_C$ are the tristimulus values of the outputs of the output device 11; $I_R, I_G,$ and $I_B$ are the magnitudes electron beams generated by the display circuitry 14; and $x_R, x_G, x_B, y_R, y_G, y_B, z_R, z_G,$ and $z_B$ are the nine tristimulus values of the output device 11. The tristimulus values are measured at the factory where the output device 11 is constructed.

The gamma values memory 34 stores three gamma value tables, one for each electron beam. A gamma value table maps the relationship between the voltage on a cathode of the display circuitry 14 and the electron beam generated by that cathode. The beam currents are often exponential with respect to the voltage on the cathode. The exponent that describes the relationship between the voltage on the cathode and the electron beam is the gamma value of the cathode. The gamma tables are measured at the factory where the output device 11 is manufactured and are stored in the gamma values memory 34.

The beam current values memory 36 stores reference values for each of the electron beams. The reference values are a baseline white point for the output device 11. The beam current values serve as the initial point, or bias, to which the output device 11 is calibrated.

Figure 3:
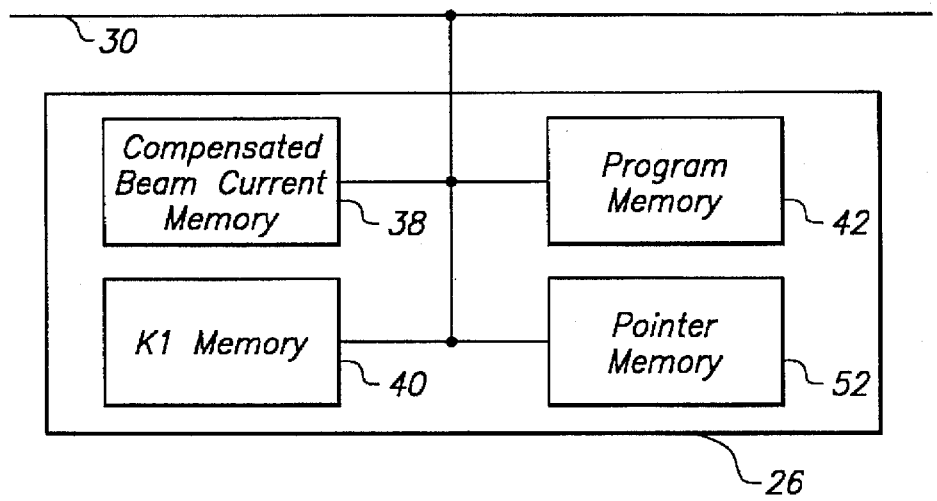
FIG. 3 is a block diagram showing the preferred embodiment of the memory of the present invention.

Referring now to FIG. 3, a block diagram of the memory 26 is shown. The memory 26 is a conventional dynamic random access memory and a conventional disk drive. While the components of the memory 26 will now be discussed as separate devices, those skilled in the art will realize that the memory 26 may be a single dynamic random access memory and a single disk drive. The memory 26 comprises an ambient illumination compensated beam current memory 38, a $K_1$ memory 40, a program memory 42, and a pointer memory 52. The ambient illumination compensated beam current memory ("AIC") 38 stores data that is calculated by the processor 24. The processor 24 calculates the proper adjustment for the out-put device 11 to compensate for ambient illumination. At different times, the ambient illumination may vary. The processor 24 calculates the adjustments for a specific ambient illumination such as early morning and generates a signal. The processor 24 uses this data to adjust automatically the out-put of the out-put device 11 at different times. The AIC 38 stores adjustment data for many different times of the day, and the processor 24 may automatically readjust, at the correct time, the out-put of the out-put device 11. The method by which the processor 24 automatically re-adjusts the out-put of the display device 12 is described with reference to FIG. 9 below.

The $K_1$ memory 40 stores the reflectivity constant, $K_1$, of a reflection device. In the preferred embodiment, the reflection device is an achromatic card. The achromatic card serves as a standard to which the output of the output device 11 is compared when the system 10 is calculating the proper adjustment to compensate for ambient illumination. The processor 24 calculates the amount of ambient illumination reflected from the glass and inside coatings of the front glass plate 48 using the out-put of the display device 12, the reflectivity constant, $K_2$, of the glass and inside coatings of the front glass plate 48, and the reflectivity constant, $K_1$, of the achromatic card. The reflectivity constant, $K_1$, of the achromatic card is typically 0.42. The method by which the processor 24 calculates the amount of reflected ambient illumination is described with reference to FIGS. 7 and 8 below. In the preferred embodiment, $K_1$ is constant for all wave lengths of visible light. Similarly to $K_2$, in an alternate embodiment $K_1$ may be three values, $K_1x$, $K_{1y}$, and $K_{1z}$.

The program memory 42 stores program instruction steps that, when executed by the processor 24, implement the present invention. The program instruction steps specify the calculations that are to be made, the graphical interfaces that are to be used to communicate with the user, and the flow of data in the present invention. When the processor 24 is said to take an action, in actuality the processor 24 executes program instruction steps stored in the program memory 42 to perform the required action. In addition, the program memory 42 temporarily stores data for a display region A, a display region B, a display region C, and a display region D when the system 10 is adjusting the output of the output device 11 to match the ambient illumination. The program memory 42 stores an A display record and a B display record which store the number of times certain display regions are consecutively selected. The A display record and the B display record will be discussed with reference to FIGS. 7A, 7B, 7C, 8A, 8B, and 8C, below. The program memory 42 also stores an automatic compensation flag for indicating that the user desires the system 10 to re-calibrate automatically the output means 11 to different biases at different times. The automatic compensation flag will be discussed below with reference to FIG. 9.

The pointer memory 52 is preferably a memory that stores deviations from a white point. In the standard mode, the pointer memory 52 stores one value for hue and one value for intensity. In the expert mode, the pointer memory 52 stores three values for hue and one value for intensity. The standard mode, the expert mode, and the values stored in the pointer memory 52 will be described with reference to FIGS. 6, 7, and 8.

Figure 4A:
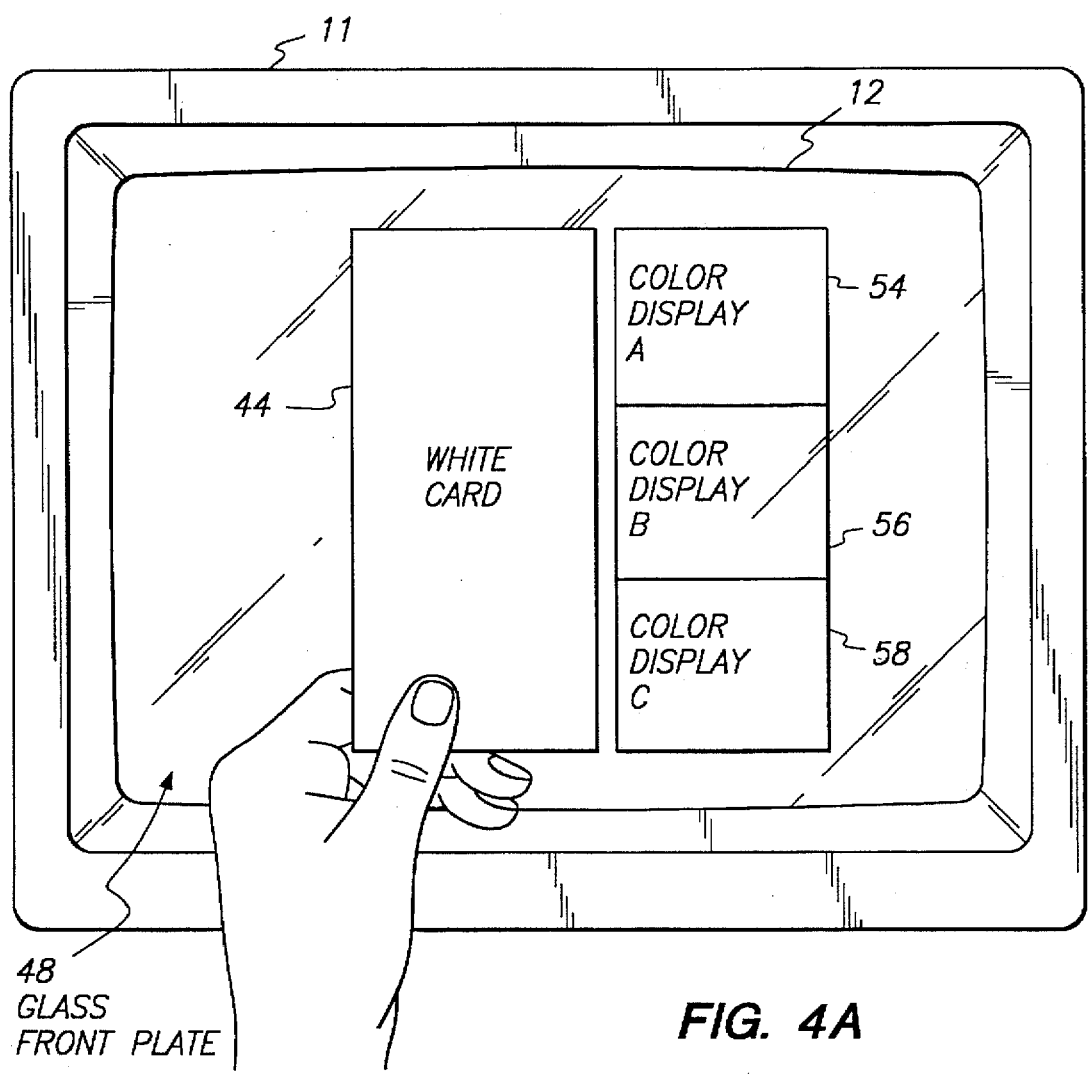
FIG. 4A is a block diagram showing an achromatic card positioned in front of the front glass plate of the output device of the present invention when the present invention is calculating the proper adjustment for color in the standard mode.

Referring now to FIG. 4A, a graphical representation of the output device 11, when the system 10 is operating in a standard mode for adjusting the color of the output device 11, is shown. FIG. 4A also shows an achromatic card 44 being held in a position that is in the plane that is tangent to the center point (not shown) of the front glass plate 48. The output of the display device 12 radiates through the front glass plate 48. FIG. 4A shows a graphical interface output by the display device 12 and created by the processor 24 executing some of the program instructions steps. The system 10 has two modes of operation for adjusting the color of the display device 11, a standard mode and an expert mode.

In the standard mode the processor 24, using the video card 28, the display controller 16, and the display circuitry 14, displays three display regions. The processor 24 displays a display region A 54, a display region B 56, and a display C 58. The user holds the achromatic card 44, next to the display regions 54, 56, and 58 in the plane that is tangent to the center point (not shown) of the front glass plate 48. The user then selects the display region 54, 56, or 58 that is closest in color to the achromatic card 44. Alternatively, the achromatic card 44 may be held in the plane tangent to the center point (not shown) of the front glass plate 48, and a spectral detector, which is programmed to simulate human perception of color, may analyze the output of the display device 12 and the achromatic card 44.

Figure 4B:
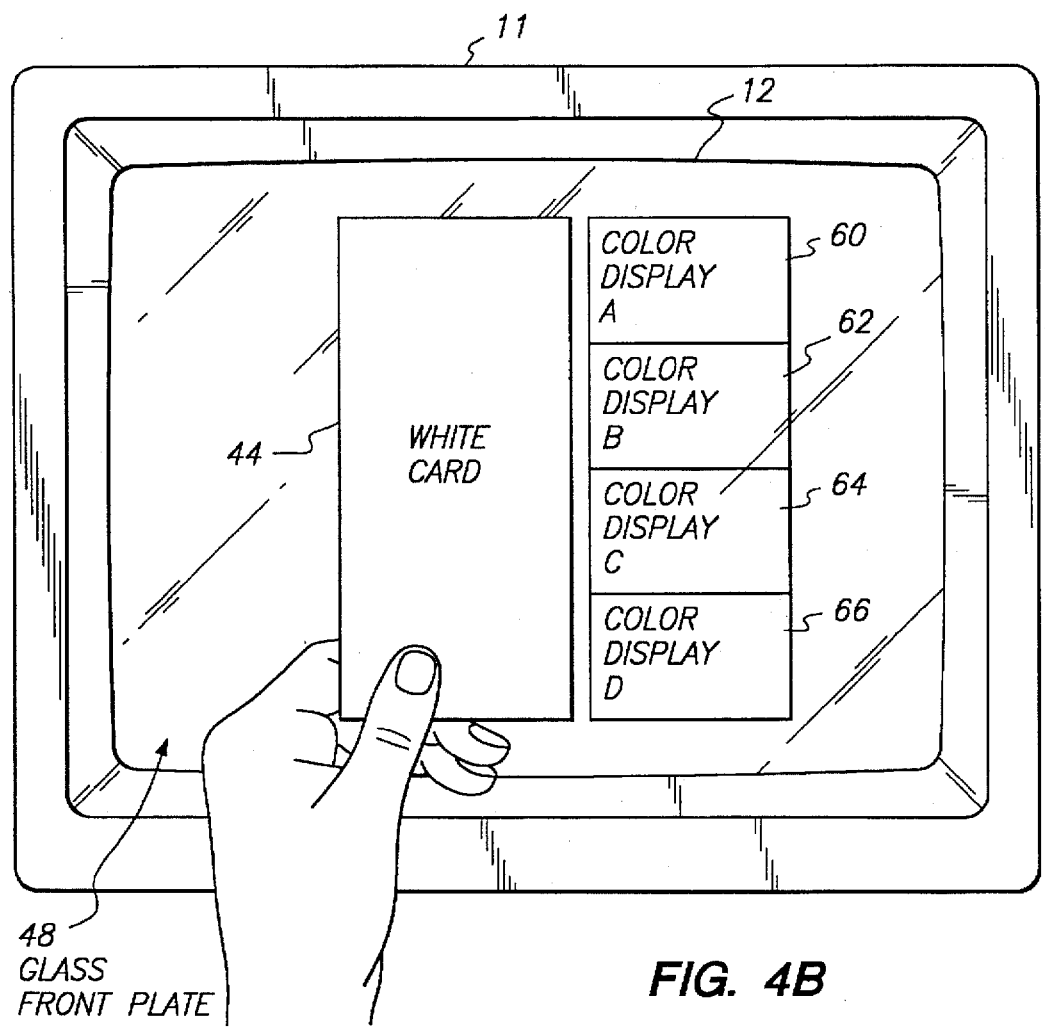
FIG. 4B is a block diagram showing an achromatic card positioned in front of the front glass plate of the output device of the present invention when the present invention is calculating the proper adjustment for color in the expert mode.

Referring now to FIG. 4B, a graphical representation of the output device 11, when the system 10 is operating in the expert mode for adjusting the color output of the output device 11, is shown. FIG. 4B also shows the achromatic card 44 being held in a position that is in the plane that is tangent to the center point (not shown) of the front glass plate 48. In the expert mode, the processor 24 displays four display regions, a display region A 60, a display region B 62, a display region C 64, and a display region D 66. The user holds the achromatic card 44 next to the display regions 60, 62, 64, and 66 in the plane that is tangent to the center point (not shown) of the front glass plate 48. Similarly to the standard mode, the user selects the display region 60, 62, 64, or 66 that is closest in color to the achromatic card 44. Alternatively, a spectral detector may be used to compare the ambient illumination reflected from the achromatic card 44 to the output of the output device 11.

Figure 4C:
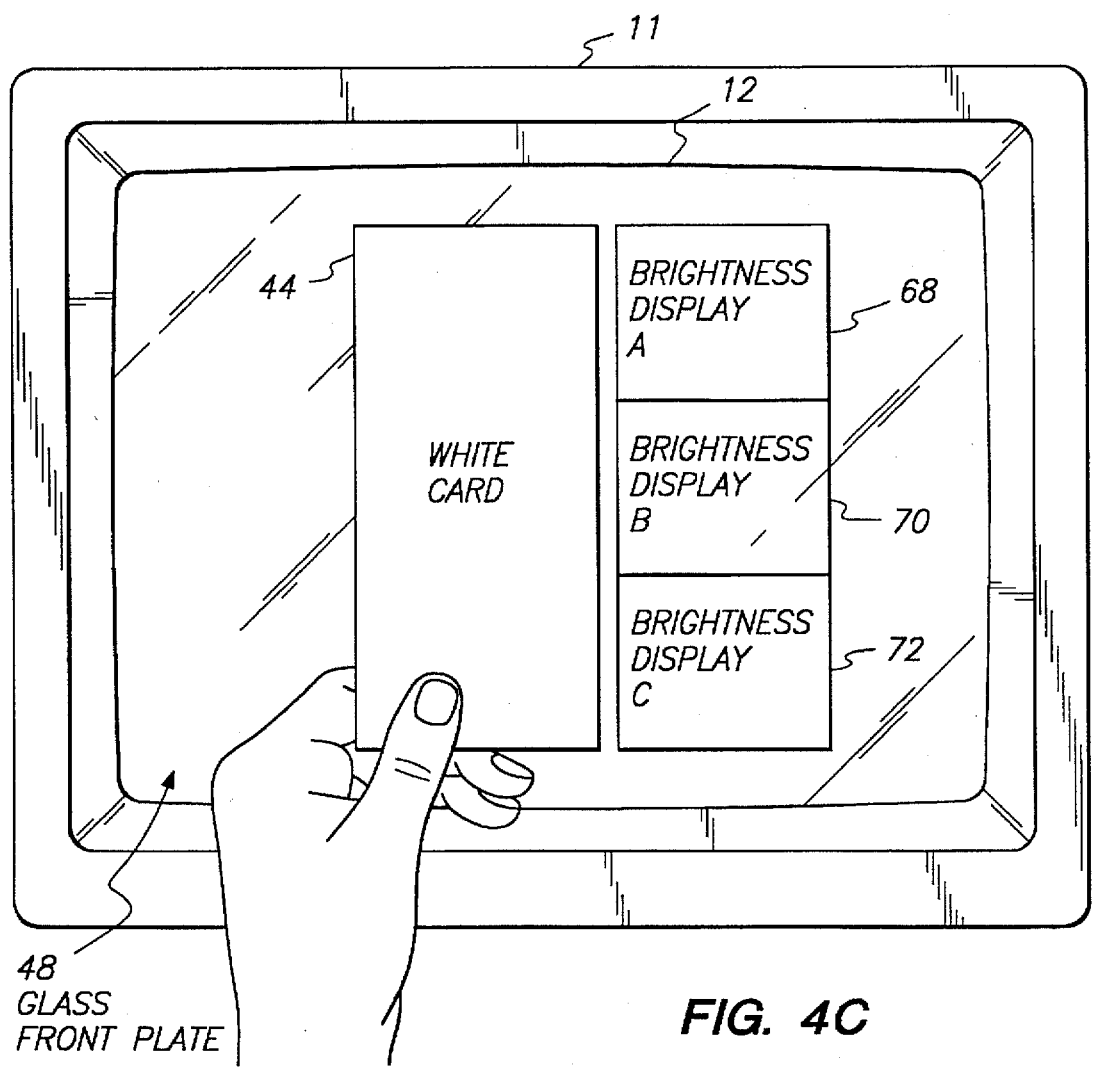
FIG. 4C is a block diagram showing an achromatic card positioned in front of the front glass plate of the output device of the present invention when the present invention is calculating the proper adjustment for intensity in either the standard mode or the expert mode.

Referring now to FIG. 4C, a graphical representation of the output device 11, when the system 10 is operating in either the standard mode or the expert mode to adjust the intensity of the output of the output device 11, is shown FIG. 4C also shows the achromatic card 44 being held in a position that is in the plane that is tangent to the center point (not shown) of the front glass plate 48. The processor 24 displays three display regions of different brightness on the display device 12. The processor 24 displays a display region A 68, a display region B 70, and a display region C 72. The user compares these three regions to the achromatic card 44 and selects the display region 68, 70, or 72 that is closest to the brightness of the achromatic card 44. Once again, a spectral detector may be used to compare the brightness of the output of the display device 12 to the ambient illumination reflected for the achromatic card 44.

Figure 5:
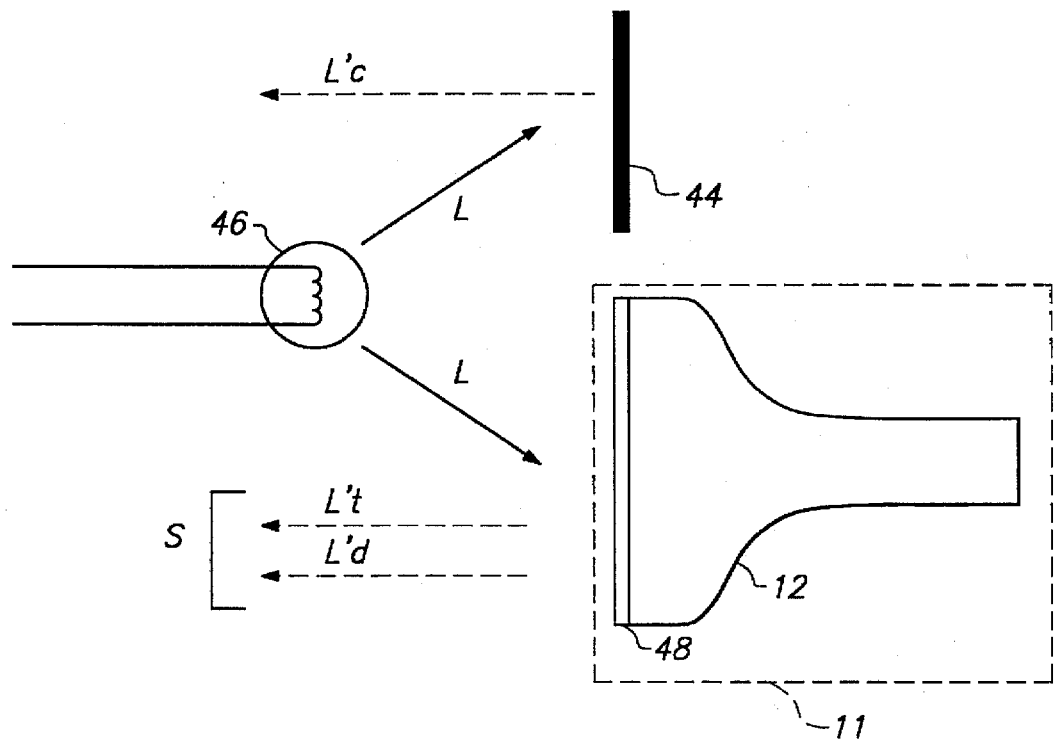
FIG. 5 is a block diagram showing the setup of the system of the present invention when it is calculating the adjustment necessary to compensate the output of the display device for the ambient illumination.

Referring now to FIG. 5, a block diagram of the output device 11 and the surrounding environment is shown. The output device 11 exists in an ambient illumination. The ambient illuminations is generated by a light source 46. The light source 46 is representational for a possible plurality of light sources of different natures. The light source 46 may include incandescent light, fluorescent light, natural light, and other types of light.

The user observes an output labeled S, from the output device 11 that is a combination of the light generated by the display device 12, labeled L'd, and the ambient illumination reflected from the glass and inside coatings of the front glass plate 48, labeled L't. The reflected ambient illumination alters the color and intensity of the light generated by the display device 12. The achromatic card 44 also reflects the ambient illumination, labeled L'c. By adjusting the output of the output device 11 to match the achromatic card 44, L'd is set so that, in combination with L't, R is equal to L'c. The processor 24 can then determine, using $K_1$ and $K_2$, the hue and intensity of the ambient illumination, L. The processor 24 uses the determined hue and intensity of the ambient illumination to adjust the output of the output device 11 to compensate for the reflected ambient illumination. FIG. 5 shows the achromatic card 44 held above the output device 11. This configuration is for ease of drawing. In actuality, the achromatic card 44 is held next to the graphical interface output on the display device 12. The achromatic card 44 is held in the plane tangent to the center point of the front glass plate 48.

Figure 6:
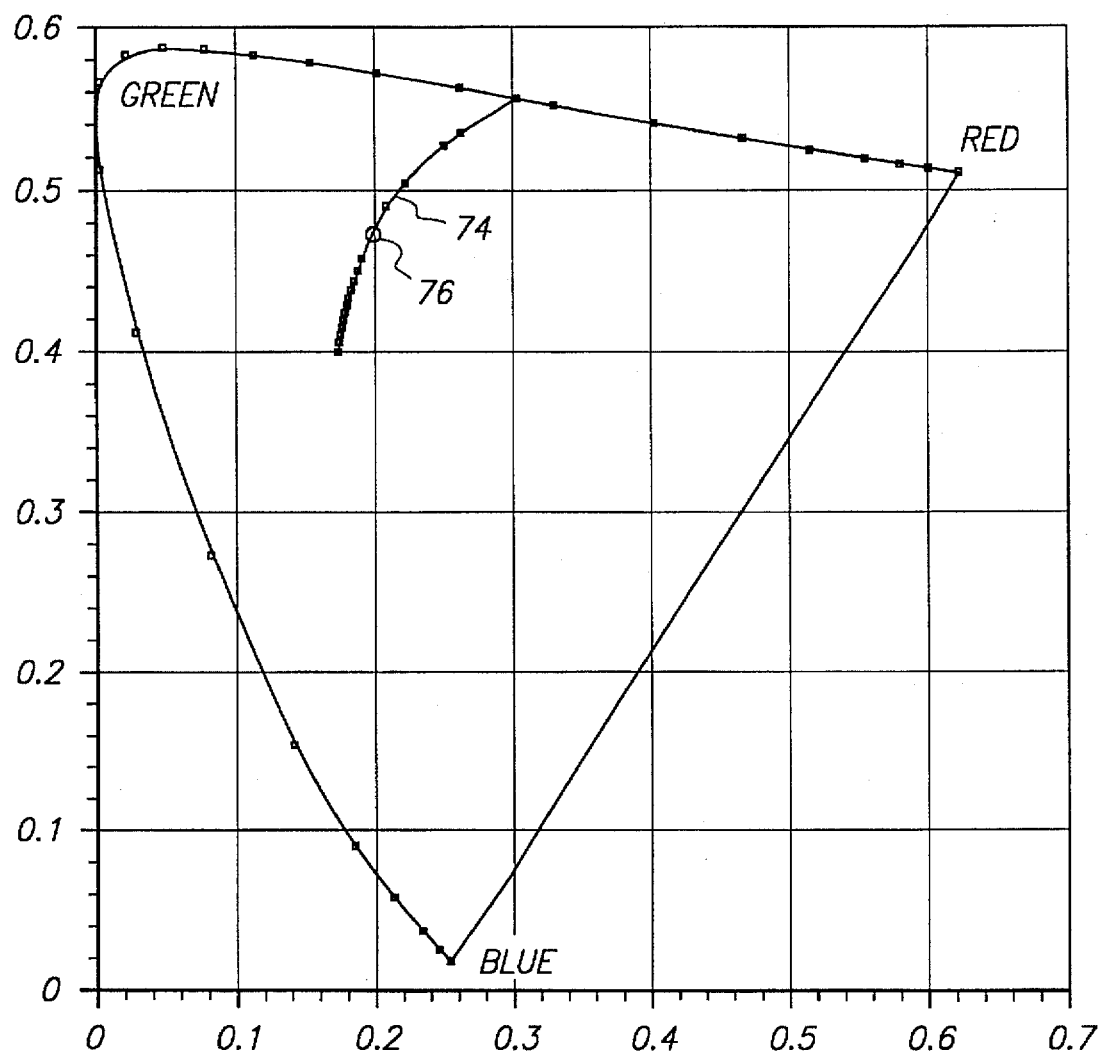
FIG. 6 is a block diagram showing a model of human perception of color used by the present invention.

Referring now to FIG. 6, the CIE 1976 UCS Diagram (hereinafter the "CIE Diagram") is shown. According to the CIE 1976 UCS model, all colors of light, which are perceptible to the human eye, may be made by combining within a pixel points of red, green, and blue light of different intensities. Each pixel is made up of a point of red light, a point of green light, and a point of blue light. The R, G, and B channels describe the red, green, and blue outputs, respectively. The ratios of the R, G, and B channels to each other are the color value of the pixel. When a region of the display device 12 is set to display a white point, the channels of all the pixels of that region are set in the ratios, to each other, for white light. In addition to the color value, each pixel has a brightness level. The brightness is a baseline value of the intensity of the pixel, and in turn of the channels. To modify the brightness of a pixel, the three channels are modified by a constant so that the ratios among the three channels are unmodified. That is, all three channels are multiplied by a constant. The color value together with the brightness level is the tristimulus value of the output.

The CIE Diagram shown in FIG. 6 represents the boundary of color perceptible to the human eye. Near the point labeled red, the color is red. Near the point labeled green, the color is green. Near the point labeled blue, the color is blue. At a white point near the middle of the CIE Diagram, the combination of red, green, and blue is observed as white light. This white point is shown in FIG. 6 by a dot 76; hereinafter the dot 76 is referred to as the white point 76. The present invention adjusts the output of the output device 11 to output accurate color. The processor 24 determines the amount of red, green, and blue light that describes the ambient illumination that is reflected from the glass and inside coatings of the front face plate 48. The processor 24 then removes these amounts from of the output device 11 in order to compensate the output for the reflected ambient illumination.

FIG. 6 also shows a line 74 which begins at a point slightly blue of the white point 76 and bisects the side of the CIE Diagram connecting the red point and the green point. This line 74 approximately describes the black body radiation of a piece of platinum as it is being heated. The colors along this line 74 are described in degrees Kelvin which correspond to the temperature at which the piece of platinum radiates light of that color. The portion of the line 74 more blue than the white point 76 represents higher temperatures than the white point 76, and the portion of the line 74 more green and red than the white point 76 represents lower temperatures than the white point 76. In the standard mode, the processor 24 adjusts the output of the output device 11 along this line 74. The processor 24 first displays, in display region B 56 shown in FIG. 4A, an output at the white point 76. The processor 24 displays in display region A 54 an output that is more blue than the white point 76 and displays in display region C 58 an output that is more red than the white point 76. The user then selects the display region 54, 56, or 58 that the user observes to be the most similar in color to the achromatic card 44. Since the output of the display device 12, which is observed by the user, is the combination of the generated light and the reflected ambient illumination and since the output of the achromatic card 44 depends on the same ambient illumination, the achromatic card 44 will match the display region A 56 only if the ambient illumination matches the monitor default hue. Otherwise, the achromatic card 44 will be closer to one of the other two display regions 54 or 58. The processor 24 then narrows the choices until it finds a point on the line 74 where the output, as nearly as possible, matches the achromatic card 44. In the standard mode, the pointer memory 52 stores two values, the amount by which the matching output deviates in color from the white point 76, and the amount by which the matching output deviates in intensity from the default setting. In the standard mode, the pointer memory 52 may store a positive number or a negative number for the color value. If the color value is positive, it represents a distance, more blue than the white point 76, along the line 74. If the color value is negative, it represents a distance more red and green than the white point 76.

In the expert mode, the processor 24 may find a matching point at any color combination within the CIE Diagram. The processor 24 is not limited to the line 74 shown in FIG. 6. When the system 10 is operating in the expert mode, the processor 24 initially displays in display region A 60 on the output device 11 a color that is at the white point 76. The processor 24 also displays in display region B 62 a color that is slightly bluer, in display region C 64 a color that is slightly redder, and in display region D 66 a color that is slightly greener than the white point 76. As with the standard mode, the user selects the display region 60, 62, 64, or 66 that the user observes to match most closely the achromatic card 44. The processor 24 then generates a display region B 62 that is slightly bluer, a display region C 64 that is slightly redder, and a region D 66 that is slightly greener than the selected display region 60, 62, 64, or 66. In this way, the processor 24 refines the output to match, as nearly as possible, the achromatic card 44. In the expert mode, the system 10 may find a matching output at any point within the CIE Diagram. In the expert mode, the pointer memory 52 stores four values. The first value represents the deviation of the matching point from the white point 76 in the direction towards the red point. The second value represents the deviation of the matching point from the white point 76 towards the green point. Similarly, the third value represents the deviation of the matching point from the white point 76 towards the blue point. The pointer memory 52 also stores a brightness indicator. In the expert mode, the three color values stored in the pointer memory 52 are positive. The brightness indicator may be positive or negative.

Current output devices 11 may not be able to generate all colors within the CIE 1976 UCS model of human color perception. The present invention can, however, analyze all colors within the CIE 1976 UCS model of human color perception. Thus, the present invention may be utilized with conventional output devices and with all advances in output device technology.

Figure 7A:
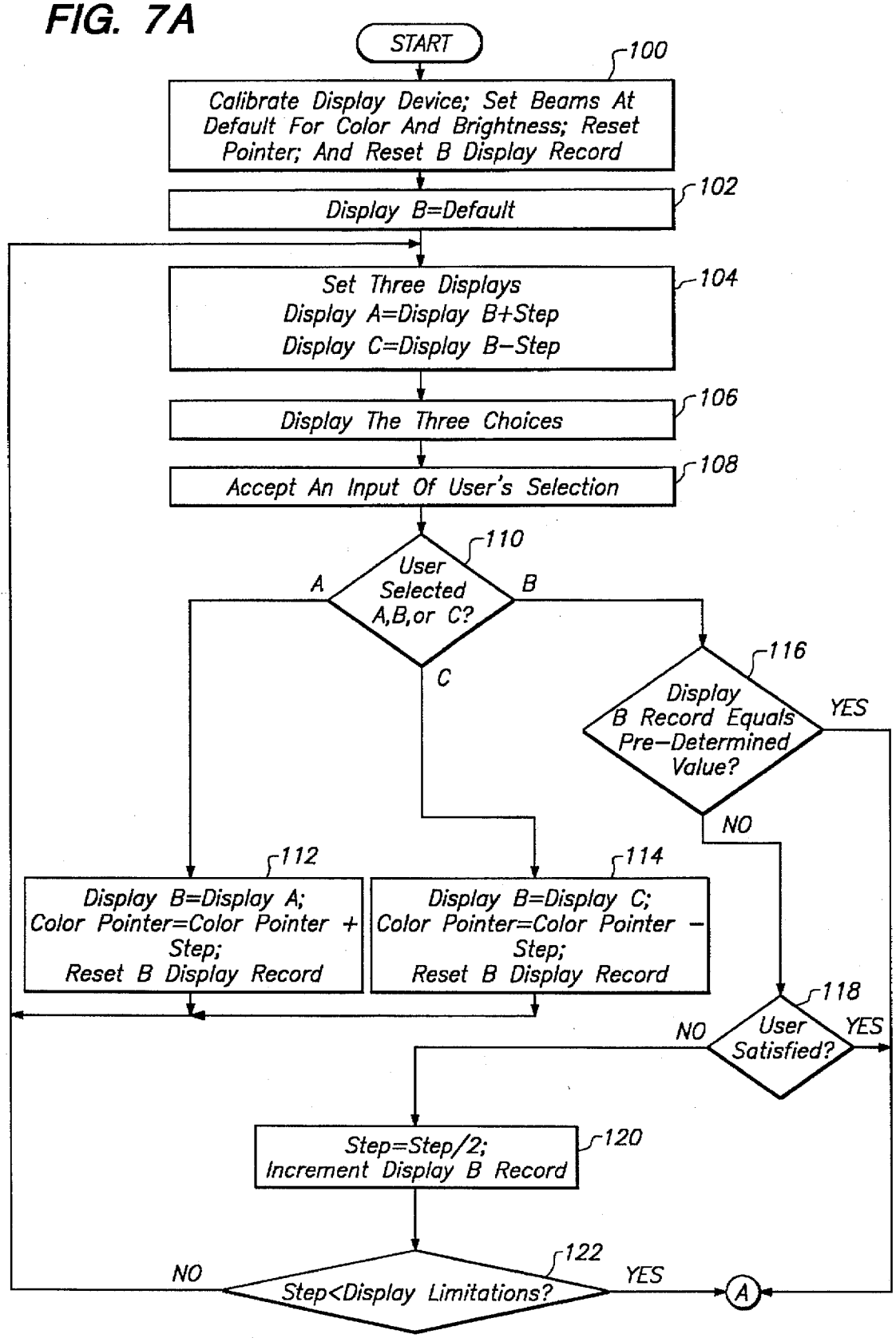
FIGS. 7A, 7B, and 7C are flowcharts showing the standard mode of the preferred method of the present invention for adjusting the output of the output device to compensate for the ambient illumination.
Figure 7B:
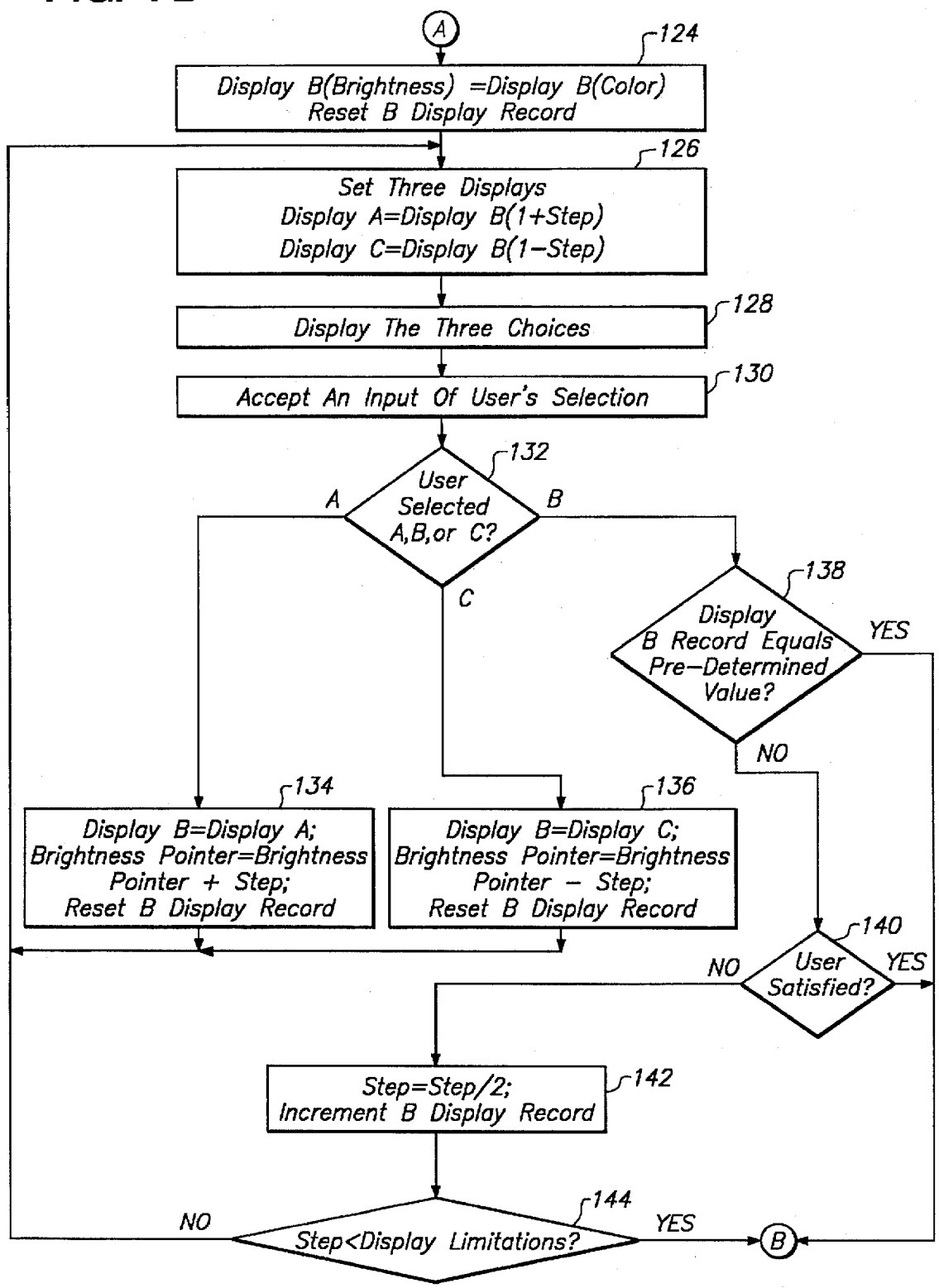
Figure 7C:
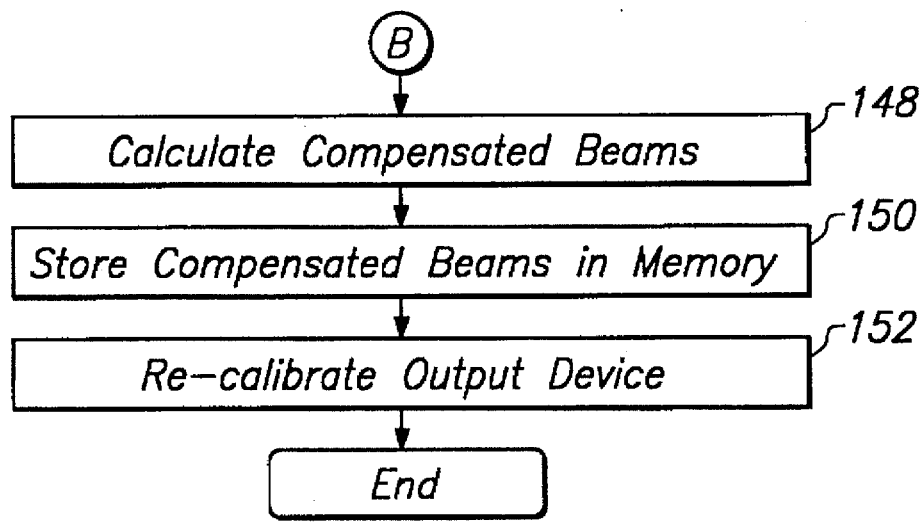

Referring now to FIGS. 7A, 7B, and 7C, a flowchart of the method of the standard mode for adjusting the output of the output device 11 to compensate for ambient illumination is shown. The method begins at step 100 where the processor 24 calibrates the output device 11, sets the electron beams at a default setting for color and brightness, resets the pointer memory 52, and resets the B display record. The processor 24 calibrates the output device 11 using the method described in pending U.S. patent application Ser. No.: 08/036,349. The output device 11 is calibrated to a setting that serves as a baseline for its operation. This baseline is the bias at which the output device 11 is calibrated. The default color setting is at the white point 76 of the model shown in FIG. 6. The default brightness setting is a mid range brightness setting. The B display record stores the number of times display region B 56 is consecutively selected.

In step 102, the processor 24 assigns the default color to display region B 56 as shown in FIG. 4A. The processor 24 assigns a color or intensity to a display region by signaling the memory 26 to record the tristimulus values of the output with a reference to the display region 54, 56, 58, 60, 62, 64, or 66 in which it is displayed. In the preferred embodiment, the color and brightness are adjusted separately. The method of FIG. 7A is directed to adjusting color. In step 104, the processor 24 assigns a color in display region A 54 that is the color assigned to display region B 56 plus a color step up the line 74, more blue, as shown in FIG. 6. The color step is an arbitrary deviation from the tristimulus values assigned to display region B 56. Likewise, the processor 24 assigns to display region C 58 a color that is the color of display region B 56 less the color step down the line 74, more red and green, as shown in FIG. 6. The processor 24 then, in step 106, outputs the three display regions 54, 56, and 58 on the output device 11. The processor 24 waits for the user to indicate, through the input device 22, the display region 54, 56, or 58 that most closely resembles the achromatic card 44, and when a display region 54, 56, and 58 is selected, the processor 24 accepts the input in step 108. The processor 24 then, in step 110, determines if display region A 54, display region B 56, or display region C 58 was selected.

If display region A 54 was selected, the processor 24, in step 112, assigns the color of display region A 54 to display region B 56, adds the value of the color step to the color value in the pointer memory 52 and resets the B display record. The processor 24 assigns the color or intensity of a first display region 54, 56, 58, 60, 62, 64, or 66 to a second display region 54, 56, 58, 60, 62, 64, or 66 by signaling the memory 26 to record the tristimulus values associated with the first display region 54, 56, 58, 60, 62, 64, or 66 with the second display region 54, 56, 58, 60, 62, 64, or 66. The processor 24 adds the value of the color step to the color value in the pointer memory 52 to record by how much the processor 24 has adjusted the output of the output device 11 from the default white point 76. The method then returns to step 104. If display region C 58 was selected, the processor 24, in step 114, assigns the color of display region C 58 to display region B 56, subtracts the value of the color step from the color value stored in the pointer memory 52, and resets the display B record. The method then returns to step 104. Should display region B 56 have been selected, the processor 24 determines if display region B 56 has been repeatedly selected a pre-determined number of times. Each time display region B 56 is selected, the processor 24 increments a record, the display B record, in the program memory 42, of the number of times display region B 56 has been consecutively selected. When display region B 56 has been consecutively selected a pre-determined number of times, the processor 24 automatically stops adjusting the output of the output device 11. The user may predetermine the number of times display region B 56 may be consecutively selected to be any number greater than 1. If display region B 56 has not been consecutively selected the pre-determined number of times, the method proceeds to step 118 where the processor 24 determines if the user has indicated satisfaction with the color. The processor 24 determines if the user has indicated satisfaction by testing for an input from the user. If satisfaction has not been indicated, the method proceeds to step 120.

In step 120, the processor 24 divides the value of the color step in half. Thus, the processor 24 narrows the possible choices for the color that matches the achromatic card 44. The processor 24 also increments the display B record in step 120. The processor 24 then determines, in step 122, if the color step is less than the limitations of output device 11. Each output device 11 has limitations on how fine it can differentiate color. If the output device 11 cannot differentiate color within the accuracy of the color step, the method continues in step 124. If the color step is not less than the limitations of the output device 11, the method returns to step 104. If the processor 24 determines in step 116 that display region B 56 has been repeatedly selected the pre-determined number of times, if the processor 24 determines in step 118 that the user has indicated satisfaction, or if the processor 24 determines in step 122 that the color step is less than the limitation of output device 11, the method proceeds to step 124.

The baseline of the brightness adjustment is the final color selection from step 138, 140, or 144. In step 124, the processor 24 assigns the color of display region B 56 for color to display region B 70 for brightness and resets the B display record. In step 126, the processor 24 assigns to display region A 68 the brightness of display region B 70 multiplied by one plus a brightness step and assigns to display region C 72 the brightness of display region B 70 multiplied by one less a brightness step. In method step 126, the brightness step used to set the brightness is different from the color step used to set the color in method steps 104 through 122. The brightness is adjusted by modifying the three channels together. The ratios between each channel and the others is maintained. While the alternate display regions 68, 70, and 72 are generated using a linear function, a non-linear function such as a exponential function may be used. In step 128, the processor 24 then displays the three display regions 68, 70, and 72 on the output device 11. The processor 24 receives an input, through the input device 22, indicating the display region 68, 70, or 72 which most closely matches the achromatic card 44, and in step 130, the processor 24 accepts such an input. In step 132, the processor 24 determines if display region A 68, display region B 70, or display region C 72 was selected. If display region A 68 was selected, the method continues in step 134 where the processor 24 assigns the brightness of display region A 68 to display region B 70, adds the value of the brightness step to the brightness value in the pointer memory 52, and resets the B display record. The method then returns to step 126. If display region C 72 was selected, in step 136, the processor 24 assigns the brightness of display region C 72 to display region B 70 and decreases the brightness pointer in the pointer memory 53 by the value of the brightness step. The processor 24 also resets the B display record in step 136. The method then returns to step 126. If display region B 70 was indicated, the processor 24 determines if display region B 70 has been consecutively selected a pre-determined number of times. Similarly to step 116, if display region B 70 has been selected the pre-determined number of times, the adjustment of the brightness will end. The processor 24 compares the number stored in the B display record to the pre-determined number to determine if display region B 70 has been consecutively selected the predetermined number of times. If display region B 70 has not been repeatedly selected the pre-determined number of times, the processor 24 determines, in step 140, if the user has indicated satisfaction with the brightness. The user may indicate satisfaction with the brightness by indicating such satisfaction through the input device 22.

If satisfaction has not been indicated, the method continues in step 142. In step 142, the processor 24 divides the step in half and increases the B display record. The processor 24 then determines if the brightness step is less than the limitations of the output device 11. If the step is not less than the limitations of the output device 11, the method returns to step 126 to adjust the brightness again.

If display region B 70 has been repeatedly selected the pre-determined number of times in step 138, if satisfaction was indicated in step 140, or if the step is less than the limitations of the output device 11 in step 144, the method continues in step 148.

In step 148, the processor 24 determines the electron beam currents necessary to bias the output device 11 so that the output of the output device is compensated for reflected ambient illumination. The tristimulus values of the output generated by the display device 12 is known. The pointer memory 52 stores the color value and the brightness value that indicate the excursions from the known starting white point 76 and default brightness. Those skilled in the art will recognize how to calculate the tristimulus values of the output generated by the output device 11 from the known excursion from a known starting white point 76 and the known excursion from the known starting brightness. In order to compensate the output device 11, the processor 24 must determine the tristimulus values of the ambient illumination. The achromatic card 44 reflects the ambient illumination according to the equations:

$$X_{L'C} = K_1 X_L \qquad (4)$$

$$Y_{L'C} = K_1 Y_L \quad (5)$$

$$Y_{L'C} = K_1 Z_L \quad (6)$$

Where $X_L$, $Y_L$, and $Z_L$ are the tristimulus values of the ambient illumination, and $X_{L'C}$, $Y_{L'C}$, and $Z_{L'C}$ are the tristimulus values of the ambient illumination reflected from the achromatic card 44. In the preferred embodiment, $K_1$ is constant for all wavelengths of light.

The glass and inside coatings of the front glass plate 48 reflect the ambient illumination according to the equations:

$$X_{L'T} = K_2 X_L \quad (7)$$

$$Y_{L'T} = K_2 Y_L \quad (8)$$

$$Z_{L'T} = K_2 Z_L \quad (9)$$

Where $X_{L'T}$, $Y_{L'T}$, and $Z_{L'T}$ are the tristimulus values of the ambient illumination reflected from the glass and inside coatings of the front glass plate 48, and $K_2$ is the reflectivity constant of the glass and inside coatings of the front glass plate 48 of the display device 12. The tristimulus observed at the front glass plate 48 is a combination of the tristimulus generated by the display device 12 and the tristimulus of the reflected ambient illumination. Thus the tristimulus observed at the front glass plate 48 is given by the equations:

$$X_S = L_{L'T} + X_{L'd} \quad (10)$$

$$Y_S = Y_{L'T} + Y_{L'd} \quad (11)$$

$$Z_S = Z_{L'T} + Z_{L'd} \quad (12)$$

Where $X_S$, $Y_S$, and $Z_S$ are the tristimulus values observed at the front glass plate 48, and $X_{L'd}$, $Y_{L'd}$, and $Z_{L'd}$ are the tristimulus values of the output generated by the display device 12. Substituting the equations 7, 8, and 9 for the reflection of ambient illumination from the glass and inside coatings of the front glass plate 48 yields the equations:

$$X_S = K_2 X_L + X_{L'd} \quad (13)$$

$$Y_S = K_2 Y_L + Y_{L'd} \quad (14)$$

$$Z_S = K_2 Z_L + Z_{L'd} \quad (15)$$

In steps 104 through 122, the output of the output device 11 was adjusted to match the ambient illumination reflected from the achromatic card 44. Therefore, the tristimulus values of the ambient illumination reflected from the achromatic card 44 are equal to the tristimulus values observed at the front glass plate 48. This identity may be expressed:

$$X_S = X_{L'C} \quad (16)$$

$$Y_S = Y_{L'C} \quad (17)$$

$$Z_S = Z_{L'C} \quad (18)$$

Substituting the equations 4, 5, 6, 13, 14, and 15 for $X_S$, $Y_S$, $X_{L'C}$, $Y_{L'C}$, and $Z_{L'C}$ respectively, yields:

$$K_2 X_L + X_{L'dMatch} = K_1 X_L \quad (19)$$

$$K_2 Y_L + Y_{L'dMatch} = K_1 Y_L \quad (20)$$

$$K_2 Z_L + Z_{L'dMatch} = K_1 Z_L \quad (21)$$

Where $X_{L'dMatch}$, $Y_{L'dMatch}$, and $Z_{L'dMatch}$ are the tristimulus values generated by the display device 12 when its output together with the ambient illumination reflected from the glass and inside coatings of the front glass plate 48 match the ambient illumination reflected from the achromatic card 44. Rearranging yields:

$$X_L = X_{L'dMatch}(K_1 - K_2)^{-1} \quad (22)$$

$$Y_L = Y_{L'dMatch}(K_1 - K_2)^{-1} \quad (23)$$

$$Z_L = Z_{L'dMatch}(K_1 - K_2)^{-1} \quad (24)$$

Thus, the tristimulus values of the ambient illumination is described in terms of the tristimulus values of the output generated by the output device 11, $K_1$, and $K_2$. The hue and intensity of the light emitted from the display device 12 needed to produce the desired white point is:

$$X_C = X_W - K_2 X_L \quad (25)$$

$$Y_C = W_W - K_2 Y_L \quad (26)$$

$$Z_C = Z_W - K_2 Z_L \quad (27)$$

Where $X_W$, $Y_W$, and $Z_W$ are the tristimulus values of the desired white point, and $X_C$, $Y_C$, and $Z_C$ are the tristimulus values of the desired white point compensated for reflected ambient illumination. The processor 24 then determines the values of the electron beams needed to generate the compensated tristimulus values through the equations:

$$X_C = I_R X_R + I_G X_G + I_B X_B \quad (28)$$

$$Y_C = I_R Y_R + I_G Y_G + I_B Y_B \quad (29)$$

$$Z_C = I_R Z_R + I_G Z_G + I_B Z_B \quad (30)$$

Where $X_R$, $X_G$, $X_B$, $Y_R$, $Y_G$, $Y_B$, $Z_R$, $Z_G$, and $Z_B$ are the tristimulus values for the display device 12 stored in the tristimulus values memory 32, and $X_C$, $Y_C$, $Z_C$ are the tristimulus values of the desired white point compensated for reflected ambient illumination. Those skilled in the art will realize that the compensated bias may be found by reducing equations 28, 29, and 30 to:

$$\begin{aligned} I_R = \\ ((X_G Y_B - X_B Y_G) Z_C) / \\ (X_R Y_G Z_B - X_G Y_R Z_B - X_R Y_B Z_G + X_B Y_R Z_G + X_G Y_B Z_R - \\ X_B Y_G Z_R) + (Y_C(-(X_G Z_B) + X_B Z_G)) / \\ (X_R Y_G Z_B - X_G Y_R Z_B - X_R Y_B Z_G + X_B Y_R Z_G + X_G Y_B Z_R - \\ X_B Y_G Z_R) + (X_C(Y_G Z_B - Y_B Z_G)) / \\ (X_R Y_G Z_B - X_G Y_R Z_B - X_R Y_B Z_G + X_B Y_R Z_G + X_G Y_B Z_R - \\ X_B Y_G Z_R) \end{aligned} \quad (31)$$

$$\begin{aligned} I_G = \\ ((-(X_R Y_B + X_B Y_R) Z_C) / \\ (X_R Y_G Z_B - X_G Y_R Z_B - X_R Y_B Z_G + X_B Y_R Z_G + X_G Y_B Z_R - \\ X_B Y_G Z_R) + (Y_C(X_R Z_B) - X_B Z_R)) / \\ (X_R Y_G Z_B - X_G Y_R Z_B - X_R Y_B Z_G + X_B Y_R Z_G + X_G Y_B Z_R - \\ X_B Y_G Z_R) + (X_C(-(Y_R Z_B) + Y_B Z_R)) / \\ (X_R Y_G Z_B - X_G Y_R Z_B - X_R Y_B Z_G + X_B Y_R Z_G + X_G Y_B Z_R - \\ X_B Y_G Z_R) \end{aligned} \quad (32)$$

$$\begin{aligned} I_B = \\ ((X_R Y_G - X_G Y_R) Z_C) / \\ (X_R Y_G Z_B - X_G Y_R Z_B - X_R Y_B Z_G + X_B Y_R Z_G + X_G Y_B Z_R - \\ X_B Y_G Z_R) + (Y_C(-(X_R Z_G) + X_G Z_R)) / \\ (X_R Y_G Z_B - X_G Y_R Z_B - X_R Y_B Z_G + X_B Y_R Z_G + X_G Y_B Z_R - \\ X_B Y_G Z_R) + (X_C(Y_R Z_G - Y_G Z_R)) / \\ (X_R Y_G Z_B - X_G Y_R Z_B - X_R Y_B Z_G + X_B Y_R Z_G + X_G Y_B Z_R - \\ X_B Y_G Z_R) \end{aligned} \quad (33)$$

In step 150, the processor 24 generates a signal to the memory 26 to store the compensated electron beam current values in the AIC 38. The processor 24 also generates a signal of the current time and signals the memory 26 to store the current time along with the compensated electron beam current values in the AIC 31. The processor 24 then, in step 152, recalibrates the output device 11. The processor 24 re-calibrates the display device 12 using the method described in pending U.S. patent application Ser. No.: 08/036,349. When re-calibrating, however, the processor 24 uses the compensated beam current values that it stored in the AIC 38 in step 150 rather than the beam current values stored in the beam current values memory 36. Thus, the processor 24 has modified the electron beams of the display device 12 so that the output device 11 will be compensated for ambient illumination reflected from the glass and inside coatings of the front glass plate 48.

Figure 8C:
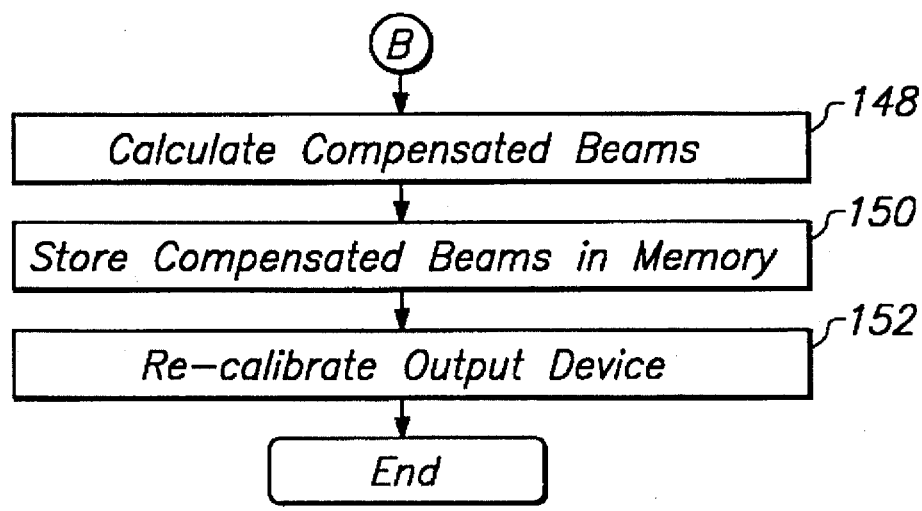
FIGS. 8A, 8B, and 8C are flowcharts showing the expert mode of the present invention for adjusting the output of the display device to compensate for the ambient illumination.
Figure 8A:
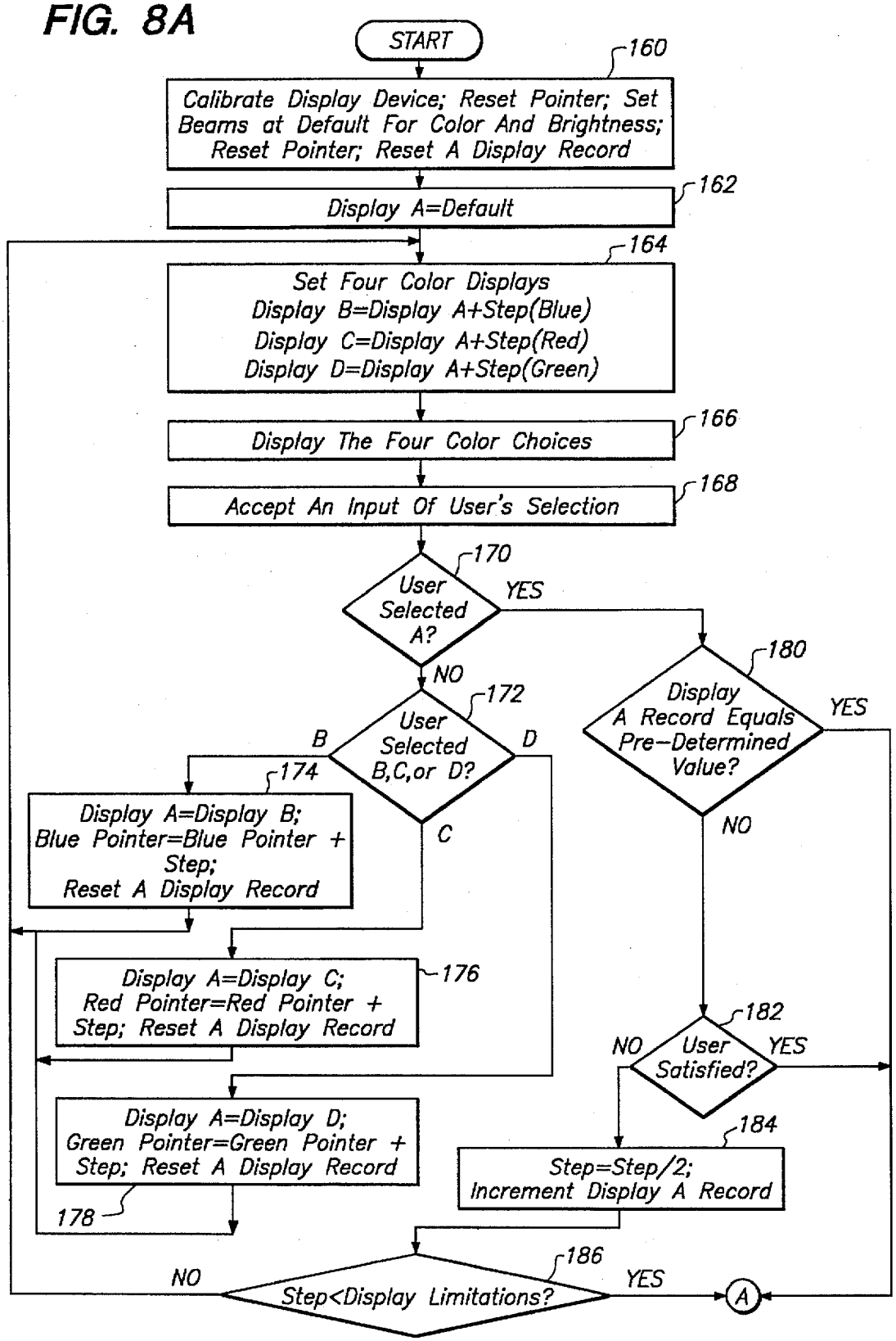
Figure 8B:
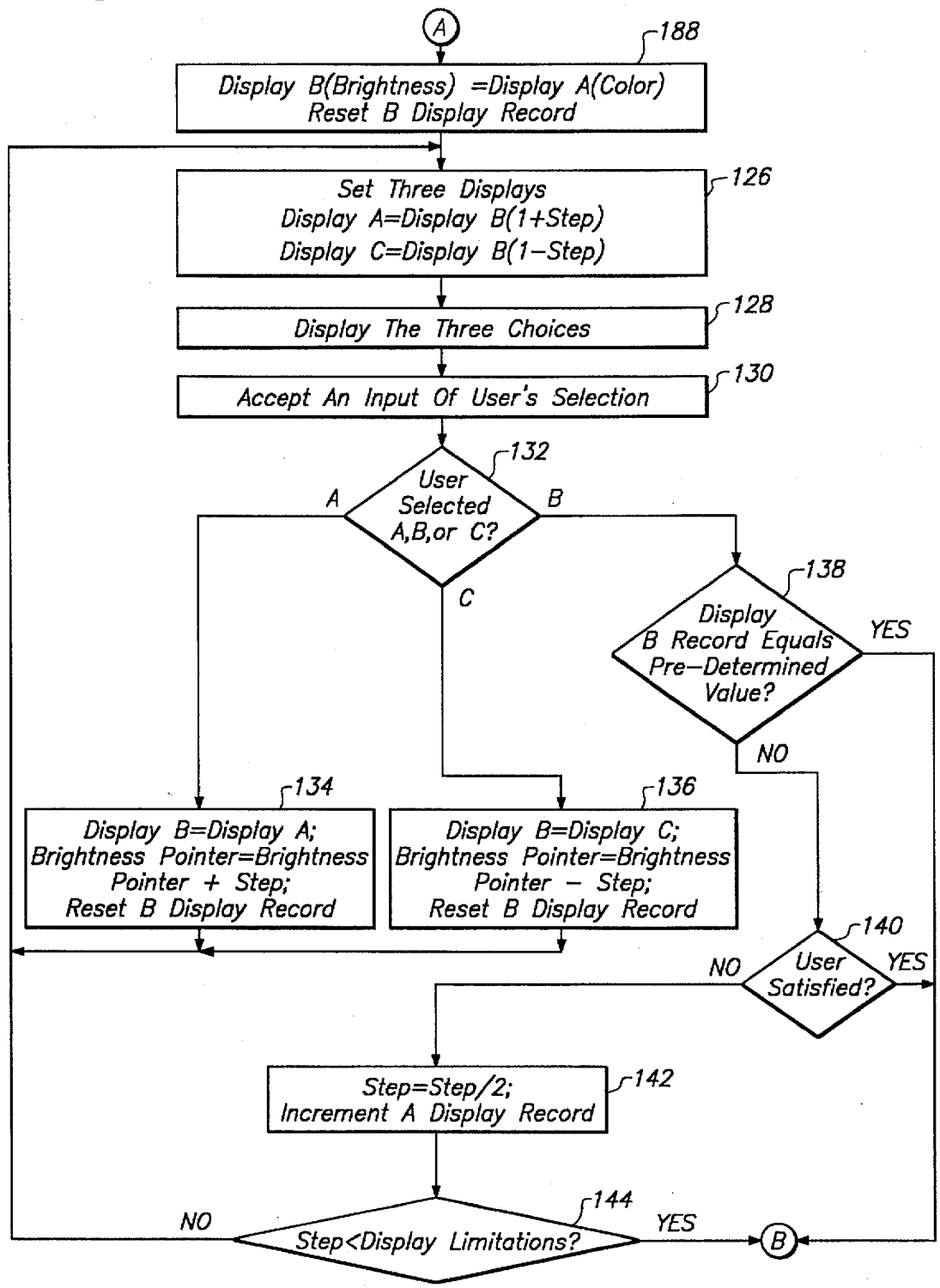

Referring now to FIGS. 8A, 8B, and 8C, a flowchart of the method of the expert mode for adjusting the output of the output device 11 to compensate for ambient illumination is shown. The expert mode is similar to the method in the standard mode described with reference to FIG. 7A, 7B, and 7C. In the expert mode, however, the output device 11 may be compensated to any point within the CIE Diagram shown in FIG. 6. The compensation is not limited to the line 74 that describes approximately the black body radiation of platinum as it is limited in the standard mode.

Beginning in step 160, the pointer memory 52 is reset, the output device 11 is calibrated according to the method described in pending U.S. patent application Ser. No.: 08/036,349, the output of the output device 11 is set to the default white point 76 and default brightness, and the A display record is reset. In step 162, the default setting is assigned to a display region A 60. In the expert mode, the processor 24 displays four display regions on the output device 11 instead of the 3 display regions in the standard mode. The processor 24 displays in a display region A 60 the current setting, in a display region B 62 a setting one color step red from the current setting, in a display region C 64 a setting one color step blue from the current setting, and in a display region D 66 a setting one color step green from the current setting. As with the standard mode, the color step is an arbitrary excursion from the current setting. In step 164, the processor 24 assigns the setting of display region A 60 plus a color step in the blue direction to display region B 62, the setting of display region A 60 plus a color step in the red direction to display region C 64, and the setting of display region A 60 plus a color step in the green direction to display region D 66. The processor 24 outputs the four display regions 60, 62, 64, and 66 on the output device 11 in step 166. The processor 24, in step 168, waits for and accepts the input of the selected display region 60, 62, 64, or 66 that most closely resembles the achromatic card 44.

In step 170, the processor 24 determines if display region A 60 was selected in step 168 as the display region 60, 62, 64, or 66 that most closely resembles the achromatic card 44. If display region A 60 was not selected, the method proceeds to step 172 where the processor 24 determines if display region B 62, display region C 64, or display region D 66 was selected. If display region B 62 was selected, the processor 24 assigns the color of display region B 62 to display region A 60 in step 174, adds the value of the color step to the blue value of the pointer memory 52, and resets the A display record. If display region C 64 was selected, the processor 24, in step 176, assigns the color of display region C 64 to display region A 60, adds the value of the color step to the red value of the pointer memory 52, and resets the A display record. Finally, if display region D 66 was selected, the processor 24, in step 178, assigns the color of display region D 66 to display region A 60, adds the value of the color step to the green value of the pointer memory 52, and resets the A display record. From steps 174, 176, or 178, the method returns to step 164. If in step 170 display region A 60 was selected, the method proceeds to step 180. In step 180, the processor 24 determines if display region A 60 has been consecutively selected a pre-determined number of times. As with the standard mode, if display region A 60 is consecutively selected a predetermined number of times, the processor 24 will end adjusting the outlet of the output device 11. The processor 24 determines if it should end adjusting the output of the output device 11 by comparing the A display record to the pre-determined number. If display region A 60 has not been repeatedly selected the pre-determined number of times, the method proceeds to step 182 where the processor 24 determines if the user has indicated satisfaction. The user may indicate satisfaction with the match between the color of display region A 60 and the achromatic card 44 through the input device 22. If the user has not indicated satisfaction, the method proceeds to step 184 where the processor divides the step by two and increments the A display record. In step 186, the processor 24 determines if the color step is below the limitations of the output device 11. If the step is not below the limitations of the output device 11, the method returns to step 164.

If the processor 24 determines, in step 180, that display region A 60 has been repeatedly selected, if the processor 24 finds, in step 182, that the user has indicated satisfaction, or if in step 186 the step is below the limitations of the output device 11, the method proceeds to step 188 where the processor 24 adjusts the brightness setting to compensate for ambient illumination. The remaining steps for compensating, in the expert mode, the output device 11 are identical to the method steps described with reference to FIGS. 7B and 7C. The remaining steps of FIGS. 8B and 8C are, therefore, numbered identically to FIG. 7B and 7C. The method described above with reference to these steps in FIGS. 7B and 7C applies to the identical steps in FIGS. 8B and 8C.

Referring also now to FIGS. 7A, 7B, and 7C. In the expert mode described with reference to FIGS. 8A, 8B, and 8C and in the standard mode described with reference to FIGS. 7A, 7B, and 7C, it was assumed that both the achromatic card 44 and the glass and inside coatings of the front glass plate 48 reflect light independent of wavelength. If the achromatic card 44, the glass and inside coatings of the front glass plate 48, or both do not reflect light independent of wavelength, $K_1$ or $K_2$, respectively, must account for the different reflectivities. In this case $K_1$ would become $(K_{1X}, K_{1Y}, K_{1Z})$, and $K_2$ would become $(K_{2X}, K_{2Y}, K_{2Z})$. Where the subscripts X, Y, and Z refer to the x, y, and z channels, respectively. In this case, the processor 24 must determine the tristimulus values of each channel of the ambient illumination separately.

Figure 9:
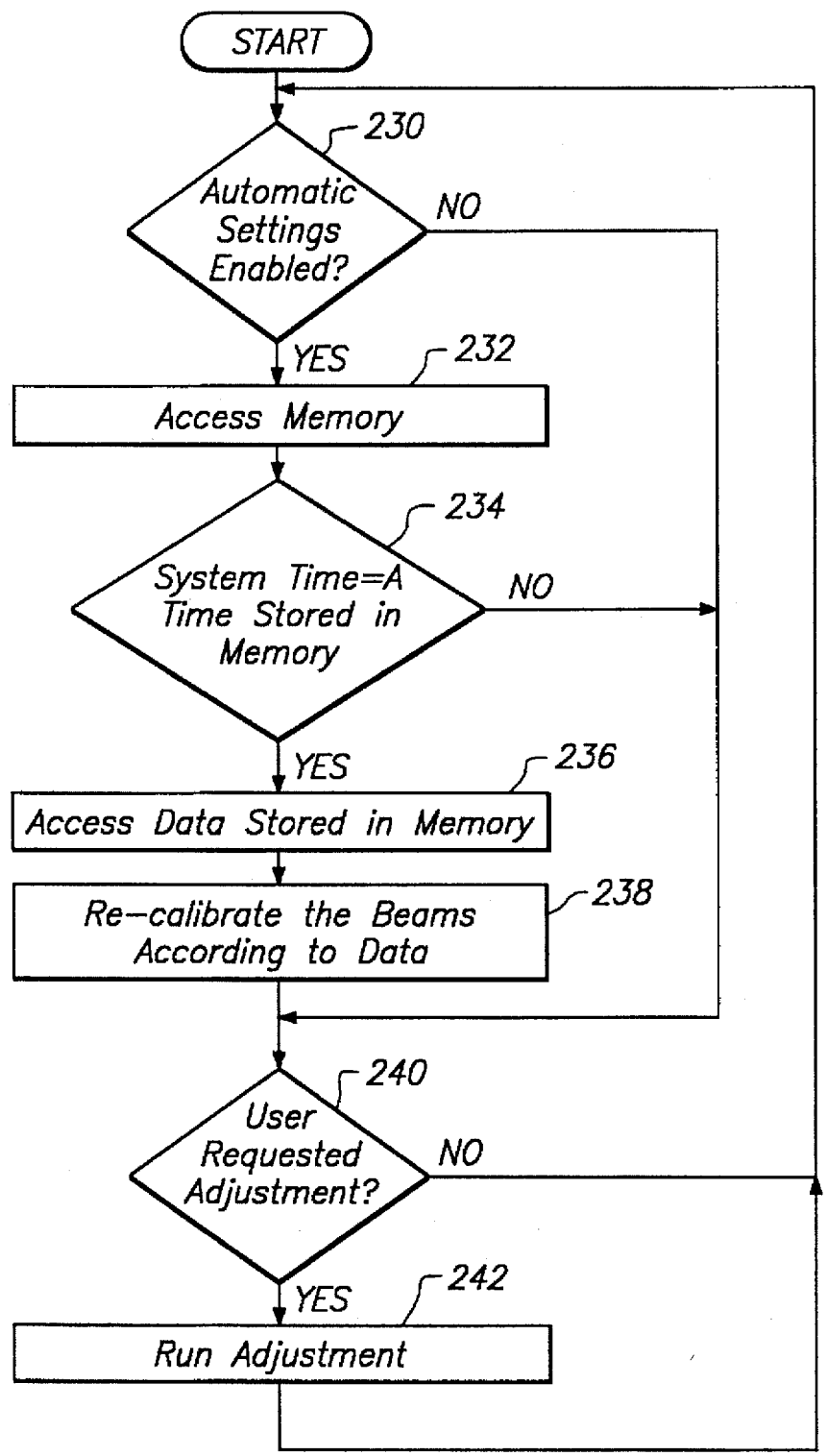
FIG. 9 is a flowchart showing the preferred method for varying the adjustment of the output of the display device to account for changes in the ambient illumination at different times.

Referring now to FIG. 9, a flowchart of the preferred method to alter automatically the compensation of the output of the output device 11 to account for changing ambient illumination is shown. At different times the ambient illumination in which the output device 11 operates may vary. The system 10 can automatically re-calibrate the output device 11 to match the changing ambient illumination. Each time the processor 24 records the compensated electron beams in the AIC 38 it also records the time at which the ambient illumination was determined. A user may have the system 10 automatically re-calibrate the output device 11 at the time each day when the compensation was determined. The system 10 can also automatically recalibrate the output device 11 with reference to the date to account for changes in the ambient illumination due to changes in the seasons. The user must first, however, have the system 10 compensate the output device 11 for the specific time. For example, the output device 11 may be compensated at one bias at 10:00 a.m. and at another bias at 3:00 p.m. on a first day, or possibly on two different days. The system 10 may first set the bias of the output device 11 at 10:00 a.m. each day at the compensated beam currents determined at 10:00 a.m. on the first day. The system 10 may then set the bias of the output device 11 at 3:00 p.m. each day at the compensated beam currents determined at 3:00 p.m. on the first day.

Beginning in step 230, the processor 24 determines if the automatic compensation is set by analyzing an automatic compensation flag in the program memory 42. The user may set the automatic compensation flag at any time. If the automatic compensation flag is set, the processor 24, in step 32, accesses the AIC 38 and compares, in step 234, the times at which the electron beams were calculated to the current time that the processor 24 has generated on the system clock. The processor 24 may compare only the time based on a twenty-four hour clock, or may also compare the date. The user may modify the times recorded in the AIC 38 so that the output device 11 is automatically re-calibrated to a bias at any time.

If the current time is equal a time stored in the AIC 38, the processor 24, in step 236, accesses the AIC 38 to obtain the beam currents associated with the time record that is equal to the current time. The processor 24, in step 238, then re-calibrates the output device 11 using the beam current values it just obtained from the AIC 38. The processor 24 uses the method described in pending U.S. patent application Ser. No.: 08/036,349, to re-calibrate the output device 11. The method of re-calibration can run in the background behind any other application being run by the components of the system 10 when coupled in another yon Neuman architecture. Furthermore, the method shown in FIG. 9 may also be run in the background. In step 240, the processor 24 determines if the user has requested that the present invention compensate the output device 11. The method also reaches step 240 if, in step 230, the automatic compensation flag was not set or if, in step 234, no time recorded in the AIC 38 was equal to the current time. If the user has requested an adjustment, the processor 24, in step 242, executes the method described with reference to FIGS. 7A, 7B, and 7C or with reference to FIGS. 8A, 8B, and 8C. After the adjustment has been run in step 242 or if no request for adjustment was found in step 240, the method returns to step 230.

While the present invention has been described with reference to certain preferred embodiments, those skilled in the art will recognize that various modifications may be provided. For example, the present invention may compensate the output of a display means of any technology. Furthermore, the present invention may compensate the output of color printers, may compensate the development of photographs, or may compensate any visual display. These and other variations upon and modifications to the preferred embodiments are provided for by the present invention, which is limited only by the following claims.

What is claimed is:

1. A system for compensating the output of an output device for reflected ambient illumination, the system comprising:

an output device having a controllable output and an input for receiving an output signal to be output on the output device;

a processor, having inputs and outputs, an output of the processor coupled to the output device; and a memory, having inputs and outputs coupled to receive signals from and to send signals to the processor, the memory including routines for displaying a first set of discrete display regions on the output device, each display region in the first set having a different optical characteristic to provide a first range of optical characteristics for comparison to a reflection device with predetermined reflectivity characteristics, and routines for controlling the processor to adjust the output signal based upon a first selected display region chosen from the first set of discrete display regions to compensate for the effects of ambient illumination.

2. The system of claim 1, wherein the memory includes routines for displaying a second set of discrete display regions on the output device, the second set of discrete display regions including the first selected display region, the second set of discrete display regions providing a second range of optical characteristics for comparison to the reflection device, the second range of optical characteristics being narrower than the first range of optical characteristics.

3. The system of claim 2, wherein the optical characteristic is color.

4. The system of claim 2, wherein the optical characteristic is intensity.

5. The system of claim 1, wherein the memory comprises:

a calibration memory, having inputs and outputs coupled to the processor, for storing display characteristics of the output device; and a reflectivity memory, having inputs and outputs coupled to the processor, for storing the reflectivity characteristics of the output device.

6. The system of claim 5, wherein the calibration memory and the refelctivity memory are read only memories.

7. The system of claim 5, wherein the memory further comprises:

a $K_1$ memory, having inputs and outputs coupled to the processor, for storing the reflectivity characteristics of the reflection device, the reflectivity characteristics of the reflection device including a first reflectivity constant; and a program memory, having inputs and outputs coupled to the processor, for storing routines for controlling the processor for determining the ambient illumination and compensating the output of the output device for the ambient illumination reflectivity memory are read only memories.

8. The system of claim 7, wherein the routines for controlling the processor determines the ambient illumination using the reflectivity characteristics of the output device and the reflection device.

9. The system of claim 7, wherein the memory further comprises a pointer memory, having inputs and outputs coupled to the processor, for storing, in response to commands from the processor, an adjustment made to the output of the output device.

10. The system of claim 7, wherein the memory further comprises a compensated output memory, having inputs and outputs coupled to the processor, for storing, in response to commands from the processor, bias values for the output device compensated for ambient illumination reflected from the output device.

11. The system of claim 7, wherein the processor further comprises a current time generator.

12. The system of claim 11, wherein the compensated output memory also stores, with each set of compensated bias values, a record of the time at which such compensated bias values were generated by the processor.

13. The system of claim 12, wherein the program memory further comprises:

a time comparator for comparing the current time to data stored in the compensated output memory; and an output adjuster, in communication with the time comparator, for automatically adjusting the output of the output device according to data stored in the compensated output memory.

14. The system of claim 1, wherein the output device is a computer monitor.

15. The system of claim 14, wherein the computer monitor is one from the group of: a cathode ray tube, a liquid crystal display, and a gas discharge display.

16. The system of claim 1, wherein the output device is a printer.

17. The system of claim 1, wherein the output device is a photograph developer.

18. The system of claim 1, wherein the reflection device has uniform reflectivity for all wavelengths of visible light.

19. The system of claim 1, wherein the reflection device is an achromatic card.

20. A method for compensating the output of an output device for reflected ambient illumination, the method comprising the steps of:

provinding a reflection device, having predetermined reflectivity characteristics, for comparing to the output of the output device;

adjusting the output of the output device to match the reflection device by selecting one of a plurality of output regions that matches the reflection device;

determining the tristimulus values of the output device at the adjusted level;

determining the ambient illumination reflected from the output device using the determined tristimulus values and reflectivity characteristics of the reflection device and the output device; and calibrating the output device to remove the effect of the reflected ambient illumination from the output of the output device.

21. The method of claim 20, wherein the step of determining the ambient illumination comprises the steps of:

calculating tristimulus values of the ambient illumination reflected from the output device; and generating a signal according to the calculated tristimulus values.

22. The method of claim 21, wherein the step of calibrating comprises the step of applying the signal to reduce the bias of the output device by the tristimulus value of the ambient illumination reflected by the output device.

23. The method of claim 21, wherein the signal generated in the generating step is stored in a memory.

24. The method of claim 21, wherein the step of adjusting comprises the steps of:

displaying on the output device a first output region and a second output region that differs by a known amount in color; and selecting one of the first or second output regions that most closely matches the reflection device.

25. The method of claim 21, wherein the step of adjusting comprises the steps of:

displaying on the output device a first output region and a second output region that differs by a known amount in intensity; and selecting one of the first or second output regions that most closely matches the reflection device.

26. The method of claim 24, wherein the step of adjusting further comprises the steps of:

designating the selected output region as the first output region; and repeating the steps of displaying and selecting.

27. The method of claim 24 wherein the first output region and the second output region are confined to outputs approximately described by the black body radiation of platinum.

28. A system for adjusting color and intensity to compensate for ambient illumination, the system comprising:

an output device having a controllable output and an input for receiving an output signal to be output on the output device, the output device having predetermined reflectivity characteristics;

a first means, having inputs and outputs coupled to the output device, for calibrating the output device to a reference output;

a first adjustment means, having inputs and outputs coupled to the first means and the output device, for generating a signal to adjust the output of the output device;

a determining means, having inputs and outputs coupled to the first means, for determining the tristimulus values of the output device at the adjusted level;

a calculating means, having inputs and outputs coupled to the first means, the first adjustment means, and the output device, for calculating the ambient illumination reflected from the output device using the determined tristimulus values of the output device, the reflectivity characteristics of the output device, and the reflectivity characteristics of the reference output; and a second adjustment means, having inputs and outputs coupled to the first means, the first adjustment means, the calculating means, and the output device, for generating a signal to adjust the output of the output device by the amount, calculated by the calculating means, of ambient illumination reflected from the output device.

29. A method for compensating the output of an output device for reflected ambient illumination, the method comprising:

providing a reflection device, having predetermined reflectivity characteristics, for comparing to the output of the output device;

displaying a first set of discrete display regions on the output device, each display region in the first set having a different optical characteristic to provide a first range of optical characteristics;

comparing the optical characteristics of the first set of discrete display regions to the reflection device;

selecting a first selected display region from the first set of discrete display regions; and adjusting the output of the output device based upon the first selected display region to compensate for the effects of ambient illumination.

30. The method of claim 29, further comprising:

displaying a second set of discrete display regions on the output device, the second set of discrete display regions including the first selected display region, the second set of discrete display regions providing a second range of display characteristics for comparison to the reflection device, the second range of optical characteristics being narrower than the first range of display characteristics;

selecting a second selected display region from the second set of discrete display regions; and adjusting the output of the output device based upon the second selected display region to compensate for the effects of ambient illumination.

31. The method of claim 30, wherein the optical characteristic is color.

32. The method of claim 30, wherein the optical characteristic is intensity.

* * * * *

UNITED STATES PATENT AND TRADEMARK OFFICE
CERTIFICATE OF CORRECTION

PATENT NO. : 5,670,985

DATED : September 23, 1997

INVENTOR(S) : Cappels, Sr., et al.

It is certified that error appears in the above-identified patent and that said Letters Patent is hereby corrected as shown below:

In the claims:

Claim 23, Column 19, line 43, please delete "generaling" and replace with --generating--.

Signed and Sealed this

Twenty-ninth Day of June, 1999

Attest:

Q. TODD DICKINSON

*Attesting Officer*    Acting Commissioner of Patents and Trademarks